United States Patent [19]

Decker

[11] Patent Number: 4,823,550
[45] Date of Patent: Apr. 25, 1989

[54] ROTARY VALVE WITH JET PUMP ASPIRATOR

[75] Inventor: Arnold F. Decker, Aurora, Ill.

[73] Assignee: Templeton, Kenly & Co., Broadview, Ill.

[21] Appl. No.: 65,938

[22] Filed: Jun. 23, 1987

[51] Int. Cl.⁴ .......................... F04F 5/10; F15B 13/04
[52] U.S. Cl. .................. 60/412; 137/625.21; 417/76; 417/87
[58] Field of Search ............... 60/411, 412; 417/76, 417/87, 151, 183; 137/625.21

[56] References Cited

U.S. PATENT DOCUMENTS

| | | | |
|---|---|---|---|
| 1,790,797 | 2/1931 | Damerell | 91/28 |
| 2,625,797 | 1/1953 | Poort et al. | 417/76 X |
| 2,707,021 | 4/1955 | Harris | 417/76 X |
| 3,372,822 | 3/1968 | Weinert | 60/411 X |
| 3,373,688 | 3/1968 | Howard | 417/187 |
| 3,423,011 | 1/1969 | Stepp | 417/187 |
| 3,556,151 | 7/1969 | Masuda | 137/625.21 |
| 3,640,069 | 2/1972 | Sugahara et al. | 417/87 X |
| 3,677,295 | 7/1972 | Schultz | 137/596.12 |
| 3,796,232 | 3/1974 | Dalton | 137/625.21 |
| 3,882,930 | 5/1975 | Schexnayder | 417/79 X |
| 3,892,259 | 7/1975 | McClocklin | 137/625.21 |
| 3,987,628 | 10/1976 | Gassman | 60/464 |
| 4,049,019 | 9/1977 | McClocklin | 137/625.21 |
| 4,210,065 | 7/1980 | Switzer | 137/625.68 X |
| 4,396,735 | 2/1970 | Haisma | 62/500 |
| 4,549,854 | 10/1985 | Yamamoto | 417/187 |
| 4,595,034 | 6/1986 | Hutson | 137/625.21 |
| 4,595,344 | 6/1986 | Briley | 417/185 |
| 4,600,363 | 7/1986 | Ise et al. | 417/187 |

FOREIGN PATENT DOCUMENTS

| | | | |
|---|---|---|---|
| 658931 | 3/1938 | Fed. Rep. of Germany | 60/412 |
| 861760 | 9/1981 | U.S.S.R. | 417/87 |

Primary Examiner—Robert E. Garrett
Assistant Examiner—George Kapsalas
Attorney, Agent, or Firm—Michael O. Warnecke; Joseph P. Calabrese

[57] ABSTRACT

Fluid flow control valves are provided having a jet pump or aspirator connected to a plurality of fluid passageways. Fluid flow from one of the passageways through the jet pump creates a partial vacuum enabling fluid flow to be drawn through the other of the fluid passageways connected to the jet pump. Such valves enable hydraulic fluids of a single-acting piston-cylinder unit or the like to be readily exhausted.

16 Claims, 14 Drawing Sheets

FIG. 1
FIG. 2
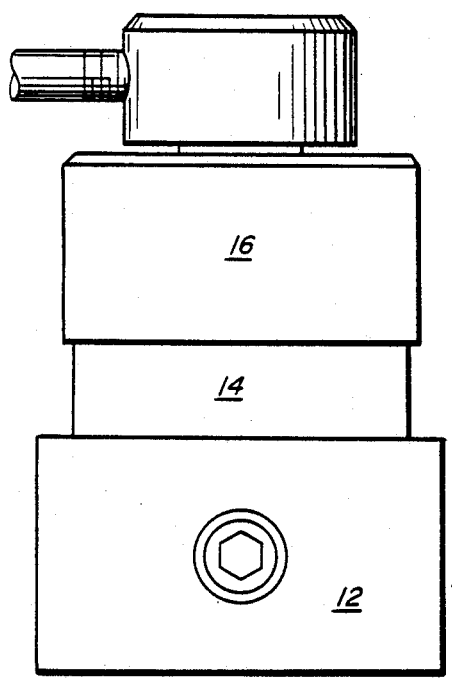
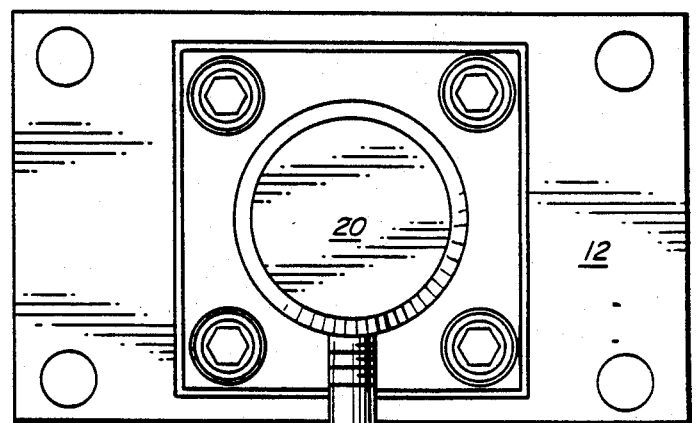
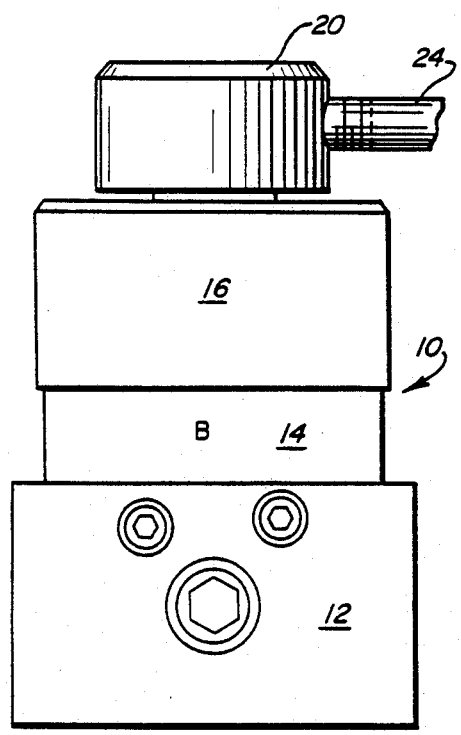
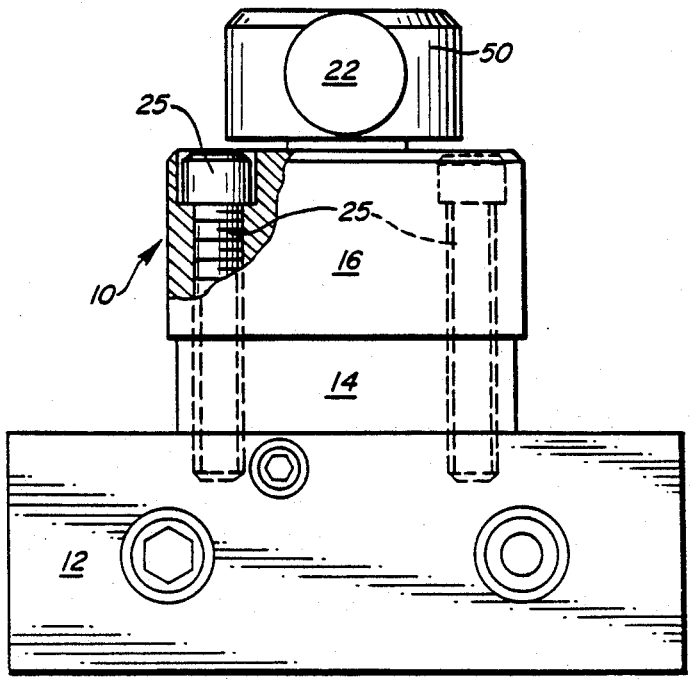
FIG. 3
FIG. 4

ADVANCE

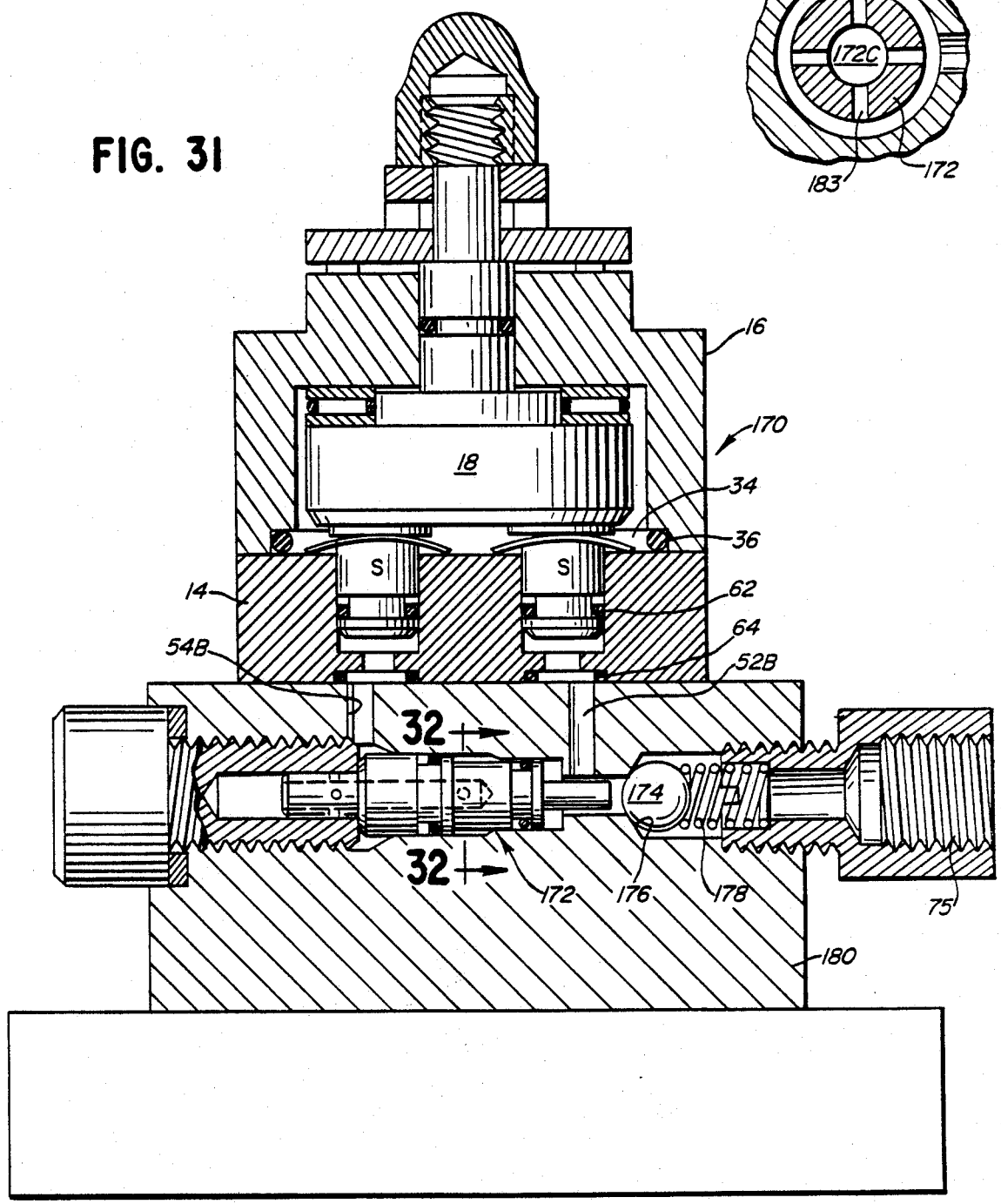

ROTARY VALVE WITH JET PUMP ASPIRATOR

BACKGROUND OF THE INVENTION

1. Field of the Invention

This invention relates to valve constructions, and more particularly pertains to valve constructions in which a partial vacuum is generated in the course of fluid flow of a main stream for purposes of aspirating fluid in a connecting fluid passageway to a discharge point. In its broader aspects, this invention is directed to systems in which fluids such as hydraulic liquids are positively pumped from hydraulic cylinders or the like by means of hydraulic pumps effecting a true pumping action or by means of a partial vacuum effecting an aspirating action.

2. Description or the Prior Art

Control valves of the type hereinafter described in detail are used throughout the hydraulics and pneumatics industry for directing the flow of oil and air in hydraulic and pneumatic circuits. A common application of these valves is for use in controlling operation of lifting rams or pistons reciprocally movable in hydraulic cylinders. Such hydraulic cylinders which may be used for direct lifting purposes, reinforcing purposes, bracing, pushing and the like may be of one of two general types. These two types are single-acting and double-acting hydraulic cylinders. Single-acting cylinders employ a piston which is hydraulically extended and such extended piston relies upon the load, a spring member or gravity to effect retraction of the extended piston. In double-acting cylinders, however, the hydraulic fluid medium is employed not only for extending the piston but also in retracting the same in the opposite direction whereby the piston may attain its lowermost retracted position. Thus positive force is applied to the piston in opposite directions of movement.

Single-acting hydraulic or pneumatic cylinders encounter many practical difficulties, particularly in heavy duty applications. Heavy duty cylinder and piston systems are normally of a compact size whereby the piston weight is such that it will only force a minimum amount of hydraulic liquid from its housing cylinder. This fact combined with the frictional resistances afforded by the hoses and conduits employed in the supplying of hydraulic liquid to the cylinder and sealing devices used in the construction of the cylinder effectively prevent the weight of the piston from forcing the hydraulic liquid back to a reservoir.

The inability to retract present in typical single-acting cylinders leads to many practical operational difficulties. Thus when employing heavy duty cylinders in confined spaces, the piston in the extended position may create problems in endeavors to remove such cylinders to a new site of use. Obviously in heavy duty applications the extendible piston should be returned to a retracted position, as close as possible to a supporting floor surface so as to obtain maximum work benefits from such cylinder. Also when such cylinder is employed for reinforcing purposes or the like in a confined space, it may be necessary to pry the extended piston into a retracted position to enable such hydraulic cylinder to be removed from its original work position.

The use of pry bars in the prior art in connection with single-acting cylinders not only rendered use of such cylinders cumbersome, but in addition may lead to damage of the extendible piston.

In accordance with this invention an improved retractor valve is provided. In a preferred embodiment a single-acting cylinder is retracted without the need for a return spring or the use of hydraulic liquid application to opposed piston surfaces as is normally applied in double-acting cylinders. The valve embodiment provides retraction of the piston of single-acting cylinders when the cylinder is used in any horizontal or vertical position. In accordance with this invention, a two or three way directional control valve creates a partial vacuum within the valve interior which in turn creates an aspirating action. Such aspirating action performs a pumping function thereby the hydraulic liquid is exhausted in a ready manner from a work cylinder as in a jack construction or the like. In addition, improved retraction performance of spring returned single-acting cylinders is realized because the resistance to flow which slows the retraction of cylinders of this type particularly as the spring forces diminish near the retracted position of the piston are greatly reduced by the aspirating action of the valve.

The prior art has previously employed control valves for use with hydraulic cylinders for controlling the fluid flow into and from cylinders in which an extendible ram is disposed. Thus McClocklin, U.S. Pat. No. 4,049,019 is directed to a rotary valve providing desired fluid control when the extendible piston or ram of a hydraulic cylinder is in the extended or neutral position, is in the process of being extended or is in the process of being retracted. Other prior art control valves comprise Schultz, U.S. Pat. No. 3,677,295, McClocklin, U.S. Pat. No. 3,892,259 and Masuda, U.S. Pat. No. 3,556,151.

In all of the disclosures of these prior art references, however, there is no suggestion of the creation of a partial vacuum by means of fluid flow control so as to aspirate or positively pump hydraulic liquid from a hydraulic cylinder.

Ejector pumps of the type hereinafter described have also been employed in the prior art in a fluid handling environment as disclosed in Howard, U.S. Pat. No. 3,373,688, Stepp, U.S. Pat. No. 3,423,011, Haisma, U.S. Pat. No. 3,496,735, Shexnayder, U.S. Pat. No. 3,882,930, Yamoto, U.S. Pat. No. 4,549,854, Briley, U.S. Pat. No. 4,595,344 and Ise, et al, U.S. Pat. No. 4,600,363. In these references, however, there is no suggestion of the valve structures or systems of the invention hereinafter described in detail.

SUMMARY OF THE INVENTION

It is thus an object of this invention to provide a system whereby hydraulic liquid is positively pumped from a single-acting hydraulic cylinder so as to render such single-acting cylinder comparable in operation to a double-acting cylinder without the need for lines, structure, etc., previously deemed necessary for forcing the extendible piston or ram of such cylinder into the retracted position.

It is a further object of this invention to provide a directional flow control valve which employs a vacuum-generating jet pump for purposes of aspirating liquid from a fluid passageway as a main fluid stream simultaneously passes through the pump.

It is another object of this invention to provide a directional control valve incorporating therein a pilot-piston operated check valve which allows communication between a main hydraulic stream passing to tank, and a fluid line connected to the hydraulic liquid in a hydraulic cylinder. With such valve, the hydraulic liquid of such cylinder may be aspirated by means of a jet pump to tank along with passage of the main hydraulic fluid stream cycling to tank, as will hereinafter be described in detail.

It is a further object of this invention to provide systems in which fluid pumps may be employed in conjunction with a control valve and a single-acting hydraulic cylinder for purposes of rendering operation of such single-acting cylinder similar to that of a double-acting cylinder.

It is yet another object of this invention to provide a valve construction employing a nozzle, an entrainment chamber, a diffuser, and an outlet whereby hydraulic liquid passing from a pumping source to tank passes through said elements creating a reduced pressure zone and hydraulic liquid in a cylinder is exhausted to tank along with the liquid being cycled from a pump.

It is a further object of this invention to provide a novel valve construction having a jet pump for creating suction in a fluid passageway connected to said pump and which jet pump may be readily incorporated in both manual and automatically operated valves.

The above and other objects of this invention will become more apparent from the following detailed discussion when read in the light of the accompanying drawings and appended claims.

In one embodiment of the invention hereinafter described, a rotary valve having a plurality of fluid passageways disposed therein is arranged over an underlying valve block. The valve and block are in communication with a passageway communicating with a work site such as a hydraulic cylinder, and hydraulic liquid under pressure discharged by a pump. In the course of extending a lifting piston in the hydraulic cylinder, the valve guides by appropriate disposition of its passageways the hydraulic liquid passing under pressure from the pump to the cylinder passageway. After the cylinder piston is in the desired extended work or "advance" position, the rotary valve may be rotated to a "neutral" position whereby the hydraulic liquid is confined within the cylinder. When it is desired to retract the cylinder piston, the rotary valve is adjusted into a "retract" position allowing hydraulic liquid pumped from reservoir or tank to cycle through a jet pump in the valve. The jet pump creates a partial vacuum within the valve which is in communication with the passageway leading directly to the hydraulic cylinder. The liquid in the hydraulic cylinder is thus aspirated to the low-pressure zone in the jet pump and to tank along with the main liquid stream being pumped through the rotary valve. The hydraulic liquid previously confined within the cylinder is thus readily exhausted to tank allowing the extendible piston to rapidly drop into a retracted position, ready for a new work cycle and redisposition if necessary in a lowered, retracted position.

Although the various valve embodiments illustrated hereinafter incorporate therein rotary valve members, other valve types such as spool valves, poppet valves, etc. will work to equal advantage by appropriately aligning the fluid passageways in desired relation relative to the vacuum generating jet pump.

In a modification of the provided invention, fluid pumps may be employed for purposes of driving fluids through a control valve with a secondary pump employed for purposes of positively exhausting the fluid from a work site. In a further modified system a bidirectional pump may be employed for purposes of both advancing the piston of the hydraulic cylinder or the like into a work position and retracting such piston as fluid is exhausted from such cylinder, as will hereinafter be described in greater detail.

BRIEF DESCRIPTION OF THE DRAWINGS

For a more complete understanding of this invention, reference will now be made to the drawing, wherein, FIG. 1 is a side elevational view of one embodiment of a control valve made in accordance with the teachings of this invention;

FIG. 2 is a top plan view of the valve of FIG. 1;

FIG. 3 is an elevational view similar to that of FIG. 1 illustrating a valve side opposite to that illustrated in FIG. 1;

FIG. 4 is a front elevational view of the valve of FIGS. 1 through 3;

FIG. 22 is a view similar to FIG. 21 illustrating valve components and fluid flow therein when such valve components are in a position to advance a ram or piston in a hydraulic cylinder or the like;

FIG. 23 is a view similar to FIG. 22 illustrating valve components in a position to direct fluid flow therein when a hydraulic ram or piston is to be retracted in a hydraulic cylinder or the like;

FIG. 30 is a view similar to FIGS. 28 and 29 illustrating the valve components in a disposition whereby the fluid flow therein retracts a ram or piston in a hydraulic cylinder or the like;

FIG. 31 is a transverse sectional view of the valve construction of FIGS. 28 through 30, and FIG. 32 is a transverse sectional view taken along 32—32 of FIG. 31.

DETAILED DESCRIPTION OF THE PREFERRED EMBODIMENTS

Figure 10:
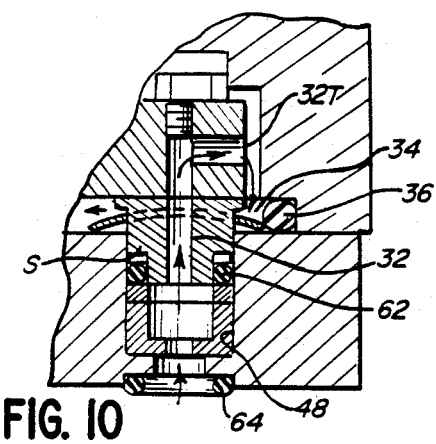
FIG. 10 is a fragmentary sectional view illustrating upper portions of the valve construction of FIG. 1 through 5 in one position of operation.

Referring now more particularly to FIGS. 1 through 4, there is illustrated therein a fluid control valve 10 made in accordance with this invention. As illustrated in FIGS. 1 and 2, the valve construction comprises a lower valve block or subplate 12 over which is mounted a valve body 14 and a valve housing 16 in which is disposed a rotary valve body 18. The separate valve body 14 and block 12 may be formed as an integral member if desired. The separate bodies illustrated facilitate element assembly and passageway formation therein.

Figure 8:
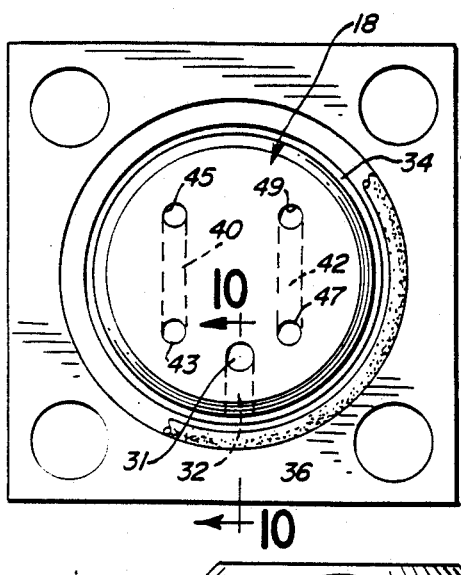
FIG. 8 is an elevational view taken along line 8—8 of FIG. 7.
Figure 7:
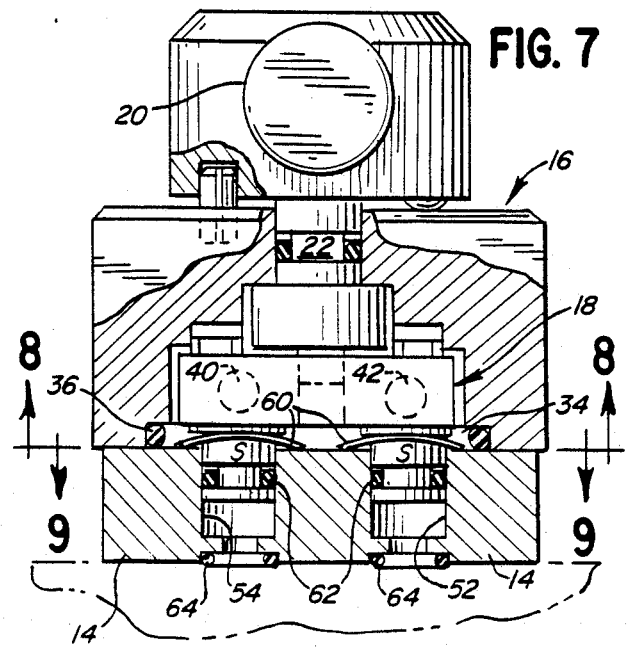
FIG. 7 is an elevational view partly broken away illustrating upper portions of the valve construction of FIGS. 1 through 5.

As illustrated in FIGS. 7 and 8 the valve body 18 is connected to and rotatably driven by rotatable valve cap 20, through connecting stem 22. The rotary valve cap is manually rotatable by means of handle 24 which threadably engages a receiving opening in the valve cap 20. The aforedescribed components are maintained in a state of assembly by means of screws 25, more clearly seen in FIG. 4, which traverse the housing 16, valve body 14 and are threadably anchored in the lower valve block 12 as illustrated in phantom line in FIG. 4, as in threaded openings 13 of FIG. 11.

Figure 5:
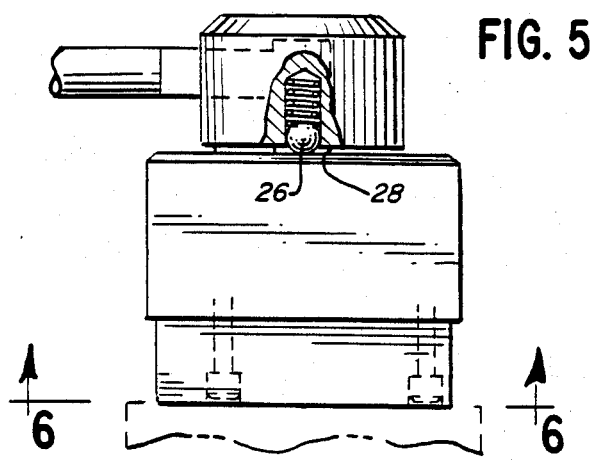
FIG. 5 is a fragmentary elevational view partly broken away illustrating the interconnection between the upper portions of the valve of FIGS. 1 through 4.

A spring loaded ball 26, more clearly seen in FIGS. 5 and 7, is mounted in valve cap 20 and is received in appropriate openings disposed in an upper surface portion of stationary valve housing 16 for purposes of positioning the valve rotary valve body 18 relative to the underlying valve body 14 with which valve 18 is in face-to-face contact, as illustrated in FIG. 7. The openings, such as opening 28 illustrated in FIG. 5, precisely position valve 18 relative to underlying valve body 14 in three spaced positions which are determinately spaced apart.

Valve rotor 18 has a plurality of fluid conveying passageways therein. Passageway 32, illustrated in FIGS. 8 and 10, has a terminal end 32T disposed at the periphery of rotor 18. As a result, fluid passing from such terminal end 32T will fall into an underlying annular chamber 34, illustrated in FIGS. 7, 8 and 10. The latter annular chamber is directly connected to a fluid reservoir or "tank" as will hereinafter be explained in greater detail. A resilient O-ring 36 encompasses the liquid chamber 34 and is compressed in fluid sealing engagement between undersurface portions of housing 16 within which rotary valve 18 is disposed and the upper surface of the valve body 18 in the manner clearly illustrated in FIG. 7 of the drawing.

Also disposed in valve rotor 18 are fluid passageways 40 and 42, see FIG. 8. Passageway 40 has opposed terminal ends 43 and 45, and passageway 42 has opposed terminal ends 47 and 49. These passageway terminal ends lie on the face or plane of rotary valve 18 in the manner illustrated in FIG. 8. It is the function of the rotor passageways to communicate with fluid passages in the underlying intermediate valve body 14. It will be noted from FIG. 9 that four main fluid passageways terminate on the surface of valve body 14. These passageways 48, 50, 52 and 54 traverse the thickness of valve body 14 in the manner illustrated in FIGS. 7 and 10. Each passageway is surrounded by a spring-loaded seat S.

The seats S effect tight fluid-seals between each of the passageways 48, 50, 52 and 54 of valve body 14, and aligned passageways of valve rotor 18. Seats S are upwardly biased by means of springs 60 in the manner most clearly seen in FIGS. 7 and 10. Each of the seats S has an O-ring 62 mounted thereon for purposes of effecting a fluid-tight seal within the valve body passageway within which the seat is disposed. The upper annular portions of the seats S effect a desired fluid seal with the engaged surface portions of the rotor 18 in the manner illustrated in FIG. 7. Such seat constructions are known in the art, and per se comprise no part of this invention.

Lower portions of each of the passageways 48, 50, 52 and 54 of the valve body 14 have disposed therein O-ring 64 for purposes of effecting fluid-tight seals with aligned fluid passageways in underlying valve block or base plate 12 illustrated in elevation in FIGS. 1 through 4. Details of the passageways contained therein are illustrated in FIGS. 11 through 16 of the drawing.

Figure 16:
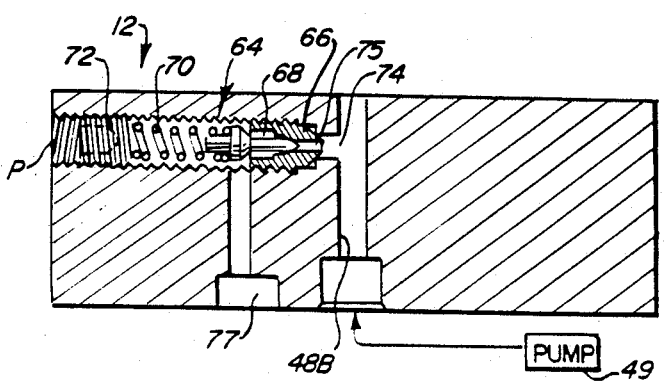
FIG. 16 is a sectional view taken along line 16—16 of FIG. 12.

Referring now more particularly to FIG. 16 comprising a transverse section of valve block 12, there is illustrated in such section lower entry 48E of a block passageway 48B which communicates with overlying fluid passageway 48 of valve body 14. The lower entryway of passageway 48B is in direct communication with a pump 49 or equivalent source of hydraulic fluid or the like, under pressure, which is directed by valve 10 in the course of passing to a hydraulic cylinder or the like. FIG. 16 also illustrates in section a pressure-limiting valve assembly 64 including a seat member 66, a conical valve member 68, which is spring biased by means of a spring 70 to close the opening in seat 66, and an adjusting screw 72. Screw 72 threadedly engages a recess in the valve block 12 for purposes of applying adjustable, desired compression forces on the engaged spring 70 and thereby determine the force which must be applied to the cone valve 68 to remove the same from its seat 66 upon entry of fluid such as hydraulic liquid or the like into passageway branch 74 communicating with passageway 48B. Accordingly, if the incoming pump pressure exceeds a predetermined limit set by the spring 70 and cone valve 68, such pressure will unseat valve 68 allowing fluid flow through opening 75 into passageway 77 which communicates with tank. Thus, the limiting valve assures that the incoming pressure does not exceed a predetermined value. It will be noted from figures such as FIG. 11 of the drawing that a number of plugs "P" are present in block 12 after the appropriate drilling to form desired fluid passageways therein.

Figure 6:
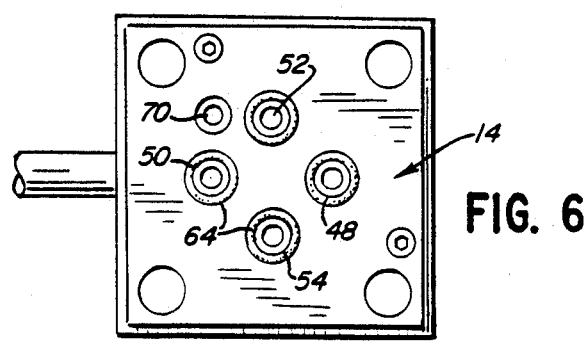
FIG. 6 is an elevational view taken along line 6—6 of FIG. 5.
Figure 9:
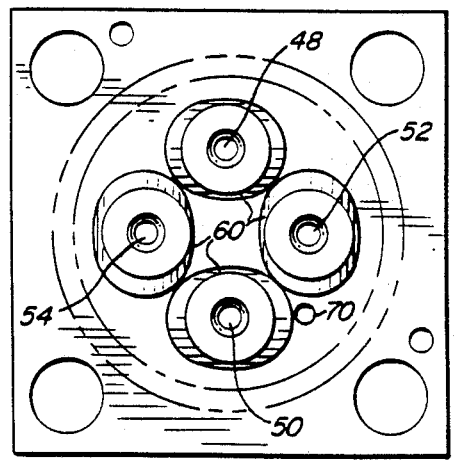
FIG. 9 is an elevational view taken along line 9—9 of FIG. 7.

Assuming the valve is in the neutral position wherein no work is being performed, the incoming fluid such as hydraulic liquid passes through passageway 48B in block 12 into overlying passageway 48 of valve body 16 (see FIG. 9) and then into overlying passageway 32 of valve rotor 18 illustrated in FIG. 10. The hydraulic liquid discharges into annular chamber 34 from which the liquid passes from chamber 34 to tank by means of vent-passageway 70 of valve body 14, (FIGS. 6 and 9). The liquid continues to pass from passageway 70 to continuation thereof comprising passageway 70B in lower valve block 12, the latter passageway being seen in FIGS. 11, 13 and 14.

With the valve rotor 18 in a neutral position, entryway 31, see FIG. 8, of rotor passageway 32 is in overlying relationship with passageway 48 of intermediate valve body 14 which is in turn in overlying alignment with passageway 48B in lower valve block 12.

Thus, with valve 10 in neutral, hydraulic fluid is pumped from the tank through the aforementioned aligned passageways out terminal end 32T of passageway 32, as seen in FIG. 10, for discharge into annular chamber 34, from which the liquid passes through the vent-passageway 70 of valve body 14 and continuation thereof 70B in lower block 12 to tank.

Upon indexing the upper rotary valve member 18 to a work position such as a position in which hydraulic fluid is passed to a cylinder for purposes of piston extension, the following fluid flow takes place. Fluid such as hydraulic liquid is pumped into the lower block passageway 48B, through the intermediate valve body passageway 48 and then into the valve rotor passageway 42 by means of entryway 47 (FIG. 8) which in the work or "advance" position will be disposed over passageway 48 illustrated in FIG. 6. It will be noted from FIG. 6 that O-rings 64 surround each of the lower entries to valve body passageways 48, 50, 52 and 54.

The fluid passing into the valve rotor 18 exits via opening 49 of passageway 42 which will be in overlying relationship with passageway 52 of valve body 14 in the "advance" valve condition. Passageway 52 is in overlying relationship with fluid passageway 52B in the lower block 12 illustrated in FIG. 11. The latter block passageway is in communication with work port 75 which is in turn in communication with the bottom entry of a hydraulic cylinder or the like, whereby a ram or piston disposed therein may be extended.

After the cylinder piston has been fully extended, the rotor 18 may be indexed to the neutral position for the desired time period in which the piston is in the extended position. In such valve position the cylinder hydraulic liquid is trapped within the cylinder as any hydraulic liquid attempting to pass through passageway 75 of block 12 engages a blind surface of the rotor 18.

When it is desired to retract a cylinder piston, the rotor 18 is indexed into the "retract" position which allows the following fluid flow. The fluid pump continues to pump hydraulic liquid into the entryway 48B of the block 12, into passageway 48 of the central valve body 14 and into entryway 43 of passageway 40 of the valve rotor 18. Liquid will then exit from end of 45 of passageway 40 which end will be located over passageway 54 of the central valve body 14. Liquid passes from passageway 54 into the opening 54B in the lower valve block 12 in which is disposed a jet pump 53 for generating a partial vacuum. Such pump is most clearly seen in FIG. 15, and comprises an upper nozzle 76 which discharges into underlying diffuser 78 located in the valve block 12, after which the liquid passes to tank. The passage of the main stream of pumped liquid through the nozzle 76 and the underlying diffuser 78 effects a partial vacuum.

Figure 11:
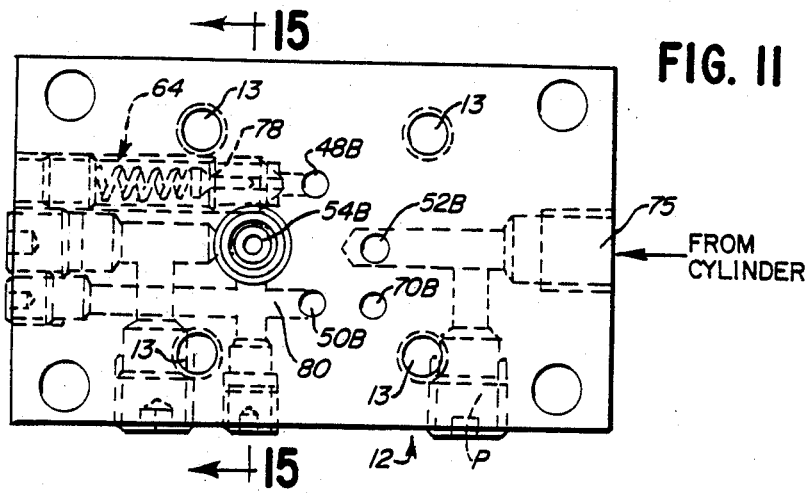
FIG. 11 is a top plan view of the lower valve block employed in the valve construction of FIGS. 1 through 4 and illustrating recesses therein in phantom line.
Figure 12:
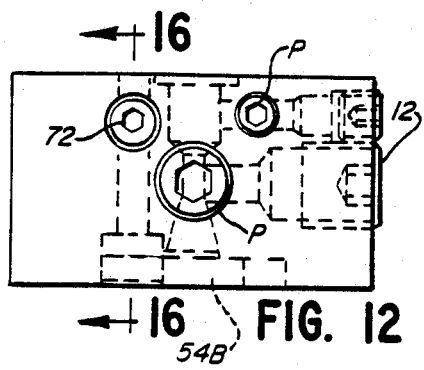
FIG. 12 is an end elevational view of the valve block of FIG. 11.
Figure 13:
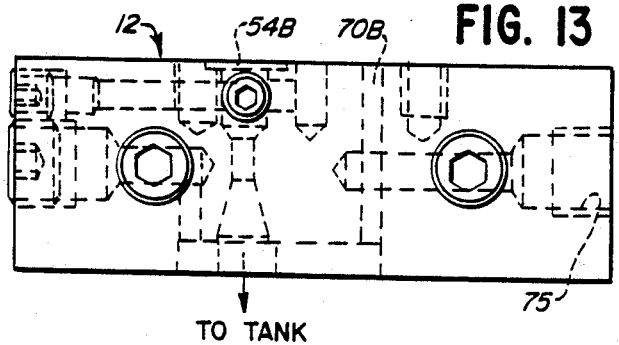
FIG. 13 is a side elevational view of the valve block of FIG. 11.
Figure 15:
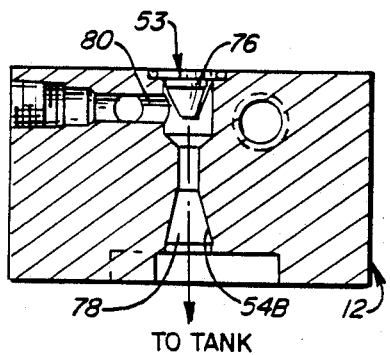
FIG. 15 is a sectional view taken along line 15—15 of FIG. 11.
Figure 14:
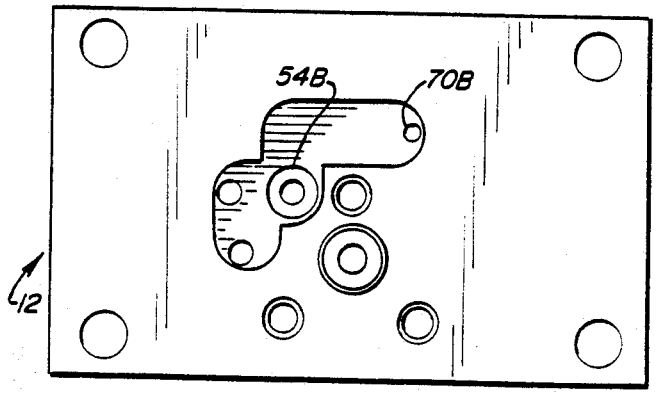
FIG. 14 is a bottom plan view of the block of FIG. 11.

Such partial vacuum is communicated to the hydraulic liquid in the cylinder via port 75 in communication with the cylinder hydraulic liquid which in turn communicates with passageway 52B of the cylinder block 12 as illustrated in FIG. 11. The latter passageway is in communication with opening 52 in central valve body 14. In the retract position, passageway 52 will be in underlying relationship with opening 47 of passageway 42 of rotor 18. The other end of passageway 42, i.e., the end 49 thereof will be in overlying relationship with seat "S" of passageway 50 of valve body 14 as illustrated in FIG. 9. The lower end of passageway 50 illustrated in FIG. 6 will be in overlying relationship with passageway 50B in the lower valve block 12 (see FIG. 11). Passageway 50B is a vertical extension passageway 80 seen in FIGS. 11 and 15, which communicates with reduced pressure zone of jet pump 53 in the valve block 12. Thus hydraulic liquid will be aspirated or pulled from the cylinder connected to port 75 of the valve block to the diffusion chamber 78 illustrated in FIG. 15 from which the combination streams of the liquid pumped from tank together with the hydraulic liquid pulled from the hydraulic cylinder will pass to tank in the manner illustrated in FIG. 15.

Figure 17:
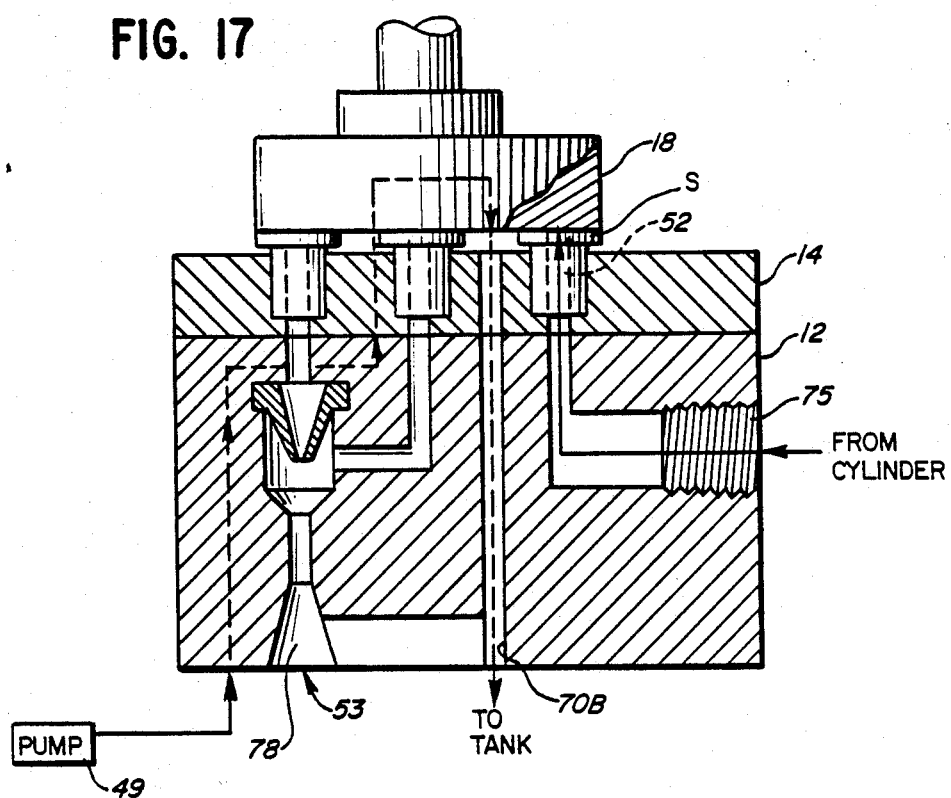
FIG. 17 is a schematic representation of fluid flow in the valve construction of FIGS. 1 through 4, with such valve in a "neutral" position.
Figure 18:
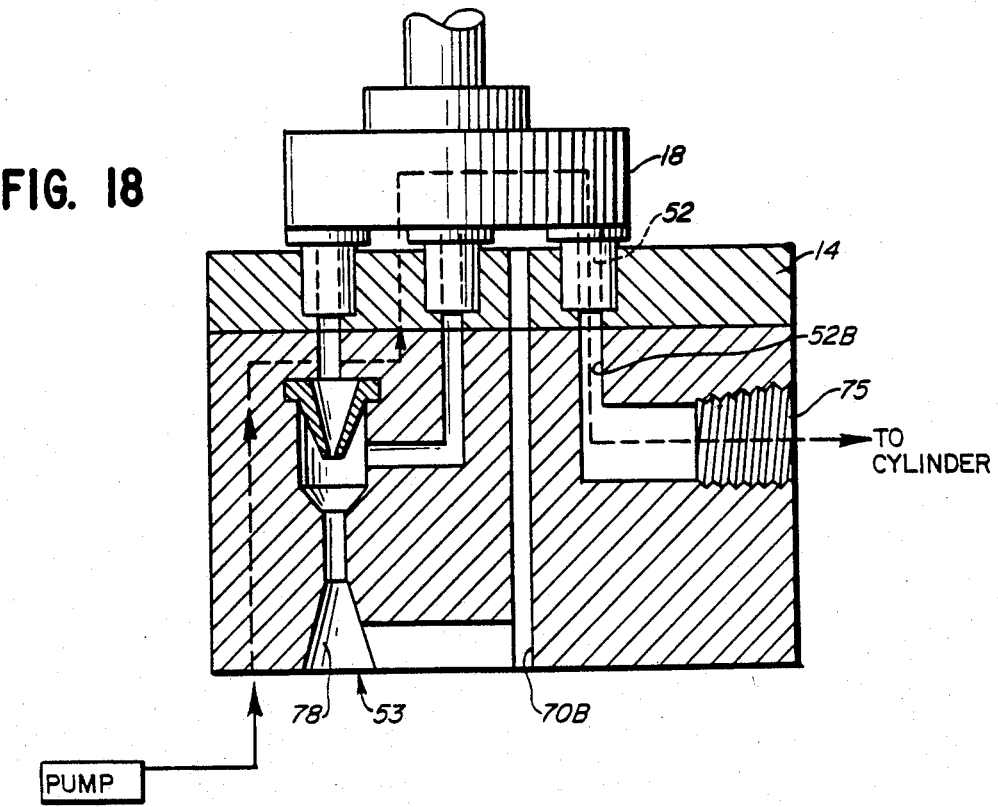
FIG. 18 is a schematic representation of fluid flow in the valve construction of FIGS. 1 through 4, with the valve in an "advance" position.
Figure 19:
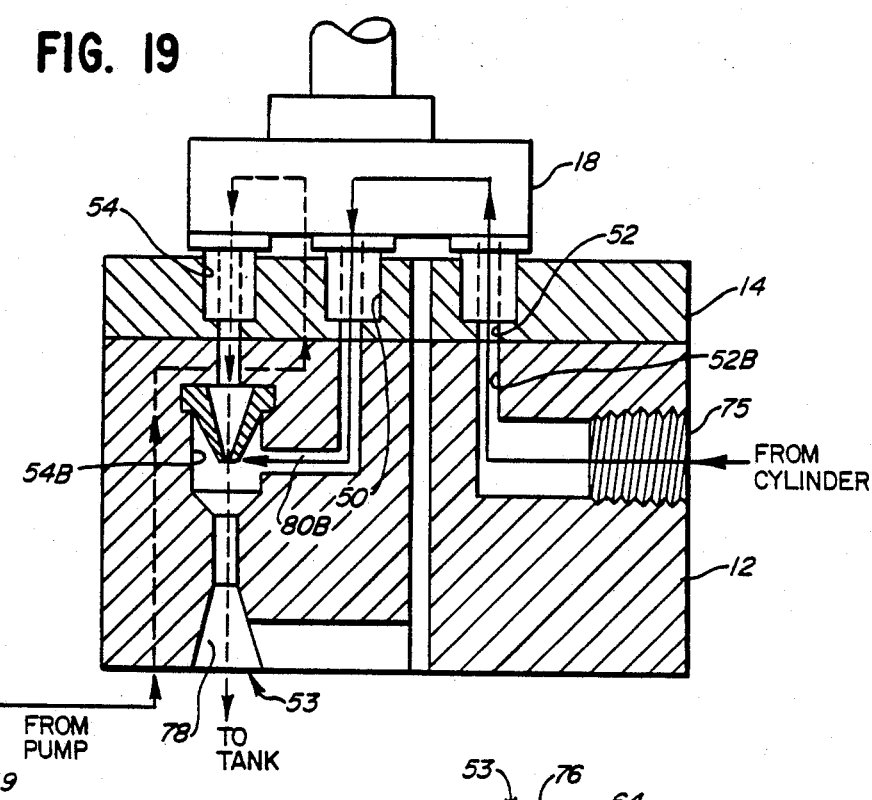
FIG. 19 is a schematic representation of fluid flow in the valve construction of FIGS. 1 through 4, with the valve in a "retract" position.

The foregoing detailed recitations of the fluid passages in the valve "neutral", "advance" and "retract" positions may also be apparent from the schematic FIGS. 17 through 19. Thus FIG. 17 illustrates a neutral position in which the main hydraulic stream is pumped directly to tank, bypassing the jet pump 53, and returning to tank through the vent passage 70B. It will be apparent from FIG. 17 that the hydraulic liquid of the cylinder will be unable to proceed into passageway 75 inasmuch as seat S disposed in valve body 14 and the encompassed passageway 52 will be in engagement with an unapertured, blind surface of the overlying rotor 16, preventing any exit of any hydraulic liquid from the cylinder in the neutral position.

In the FIG. 18 advance position, it will be seen that the hydraulic liquid from pump again bypasses the jet pump 53, passing through the appropriate passages in rotor 18 prior to entering passageway 52 in valve body 14 and underlying aligned passageway 52B of lower valve block 12 prior to entering port 75 in direct communication with the cylinder or other work site.

In the retract position of FIG. 19, the hydraulic fluid passes from the pump through appropriate passageways in the rotor 18, through passageway 54 of the central valve body 14 and into the underlying passageway 54B in which the jet pump 53 comprising the nozzle 76 and the diffuser 78 are disposed. Simultaneously, liquid is pulled from the cylinder through port 75, through connecting passageway 52B into overlying passageway 52 of the intermediate valve body 14. After passing through appropriate fluid passages in the rotor 18, the cylinder fluid enters passageway 50 of valve body 14 and connecting fluid passageway 80, the latter connecting passageway 50B with the diffuser chamber 78.

Figure 20:
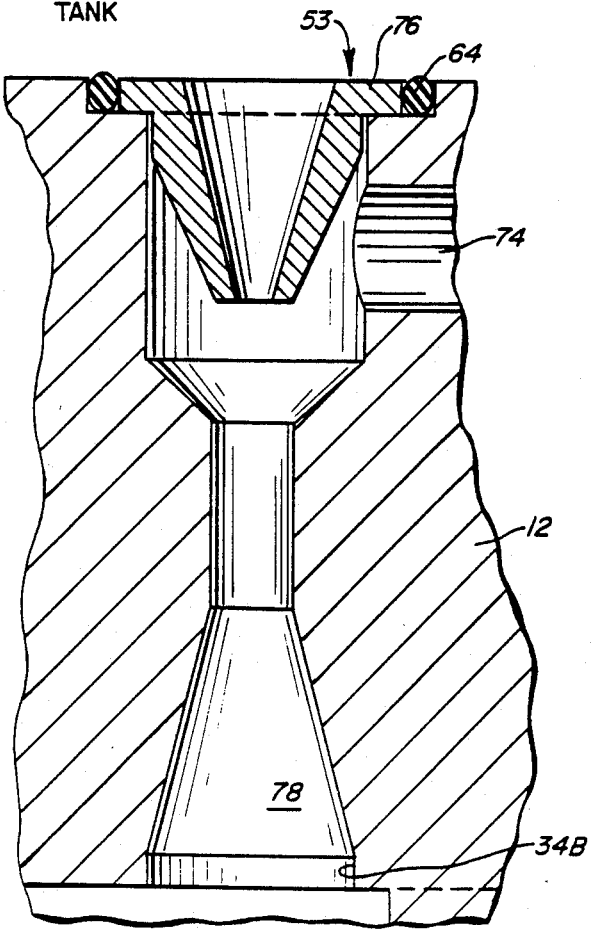
FIG. 20 is an enlarged fragmentary view, partly in section, illustrating a jet pump employed in the valve of FIGS. 1 through 4.
Figure 21:
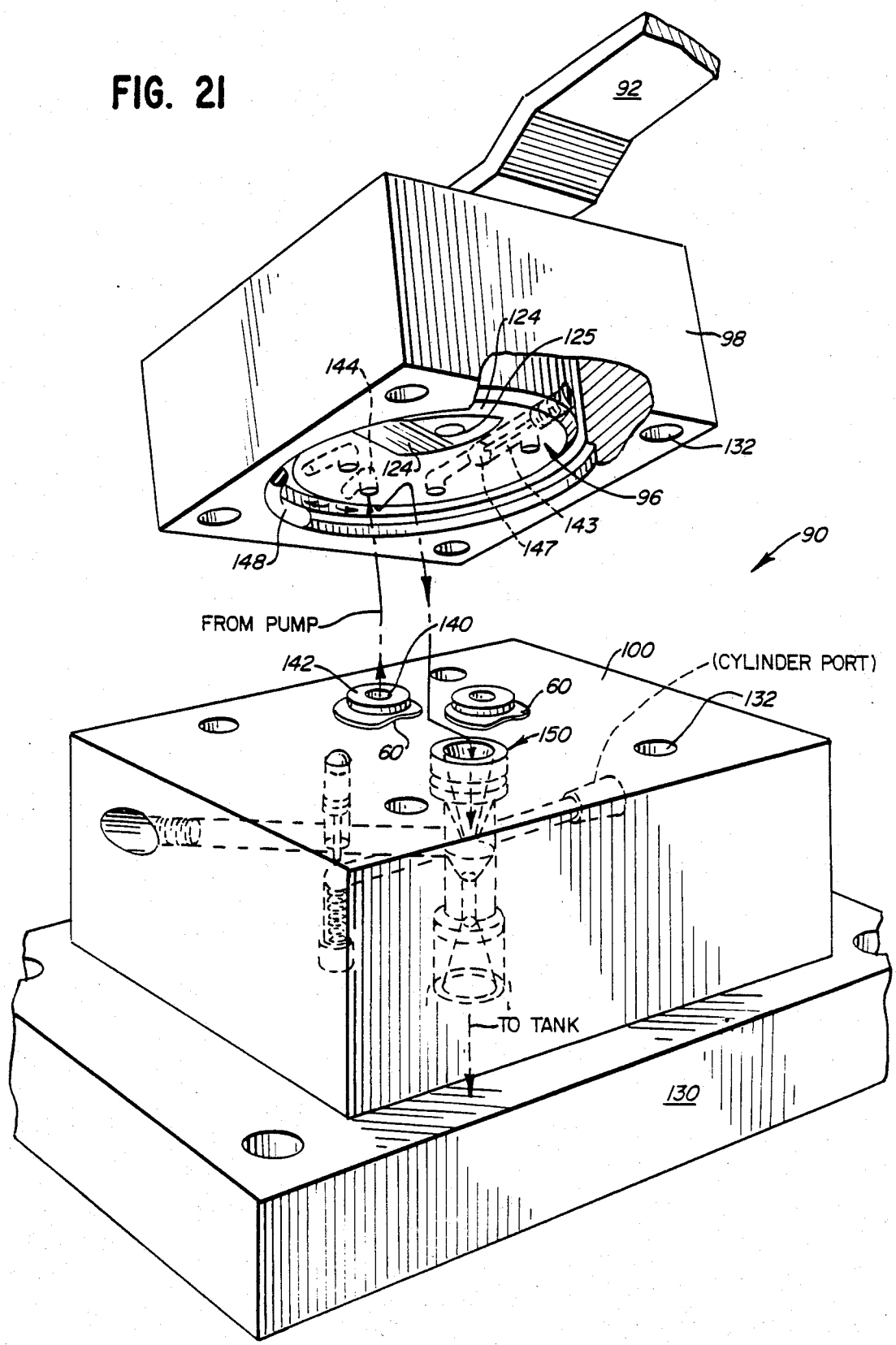
FIG. 21 is a fragmentary exploded view, partly broken away, of components employed in a modified valve construction made in accordance with the teachings of this invention.
Figure 22:
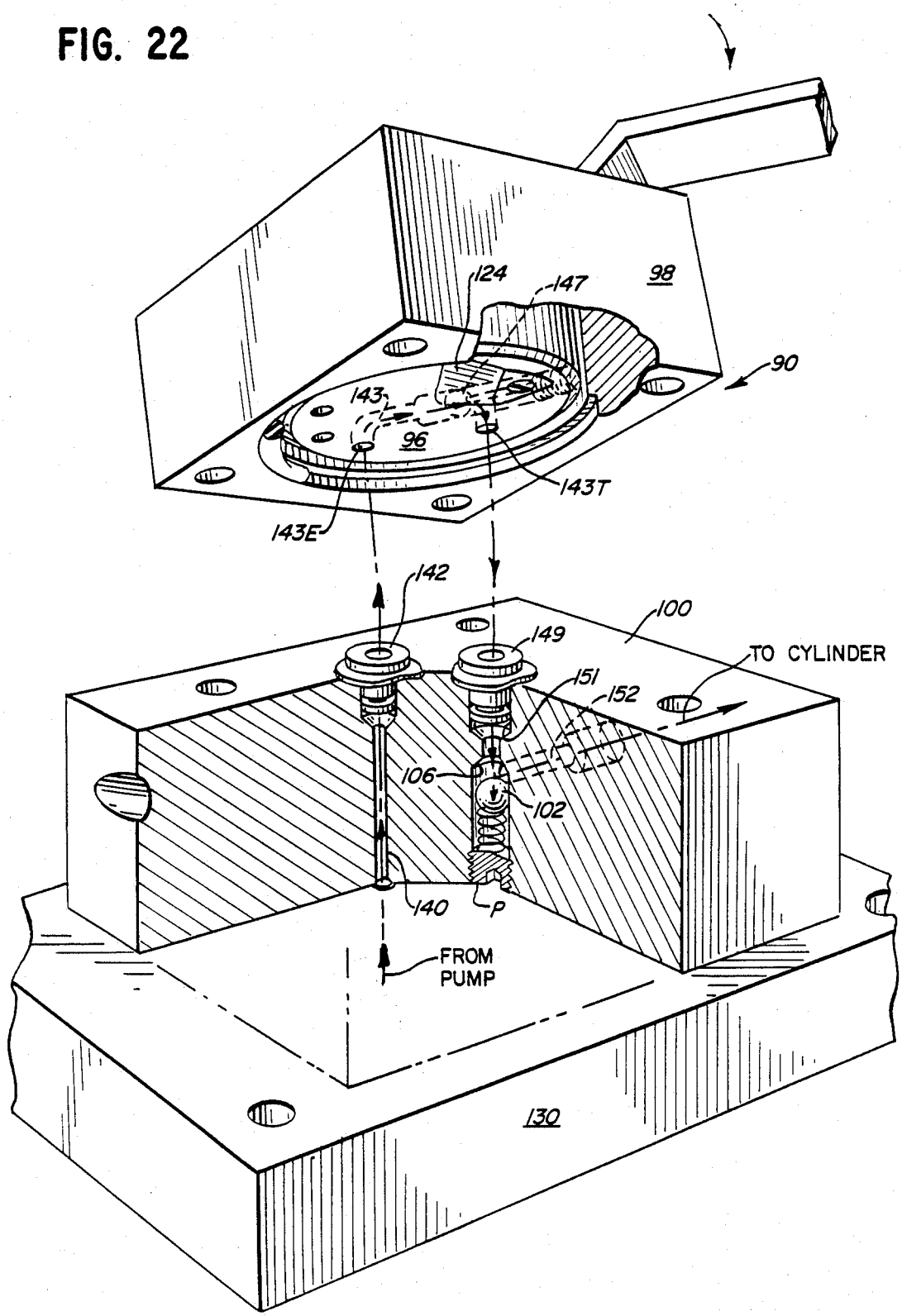

FIG. 20 is an enlarged view of the jet pump construction of this application illustrating the structure wherein the nozzle 76 has the upper periphery thereof surrounded by an O-ring 64 for purposes of engaging the undersurface of valve body 14 in a fluid-tight engagement. The jet pump 53 may be formed in two separate nozzle and diffuser pieces inserted in receiving recesses of the valve lock, or the pump may comprise a nozzle member arranged over a recess in the valve block in the form of the diffuser. Other structural arrangements are contemplated which generate fluid flow adequate to pull the hydraulic liquid from the cylinder, and are construed to be within the scope of this invention.

Figure 23:
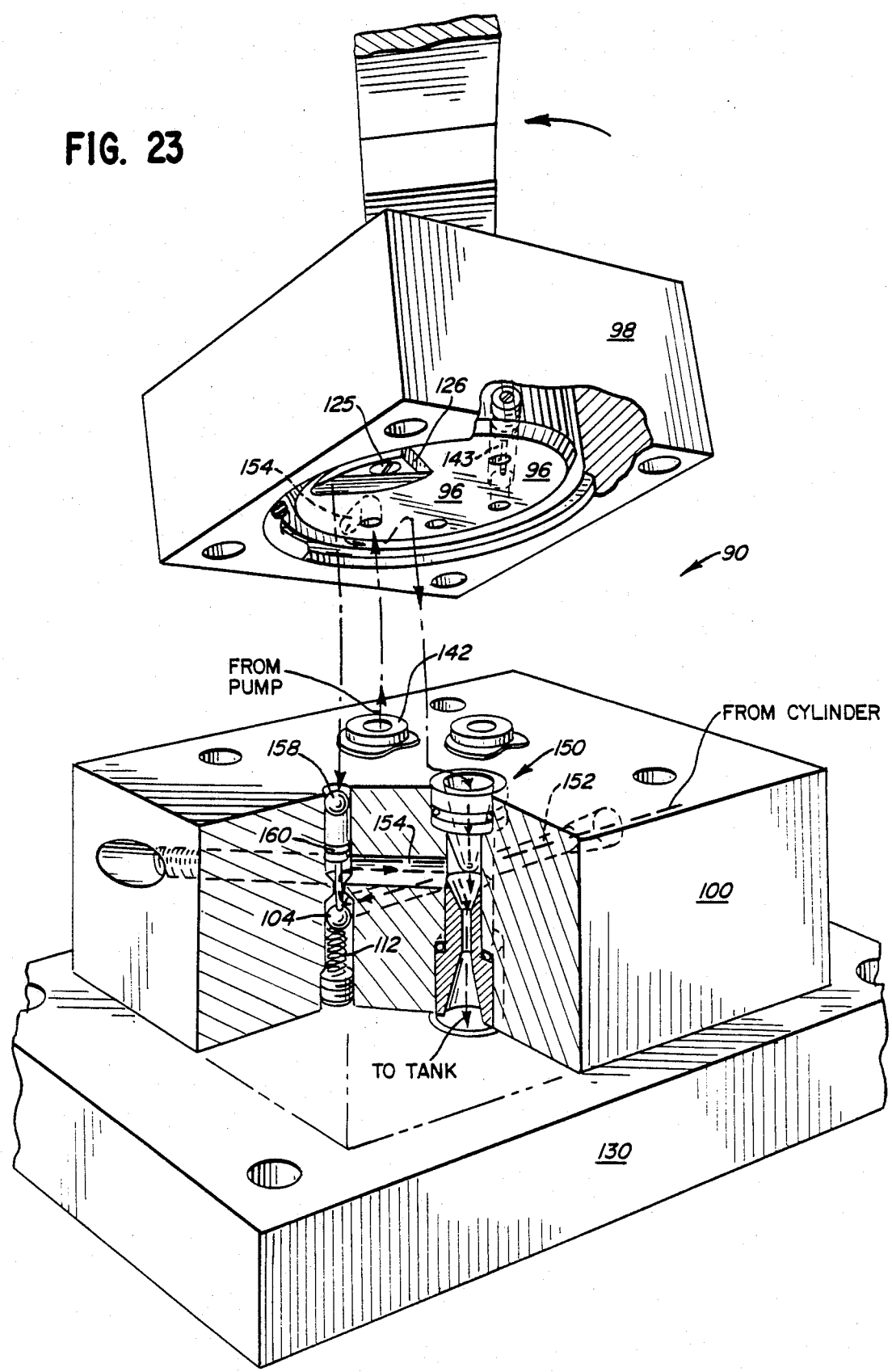
Figure 24:
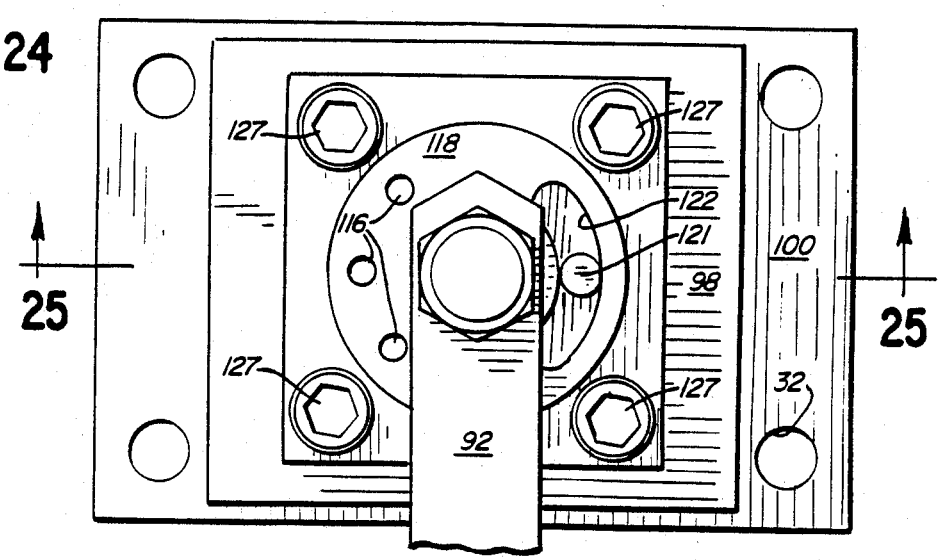
FIG. 24 is a top plan view of the valve of FIGS. 21 through 23.
Figure 25:
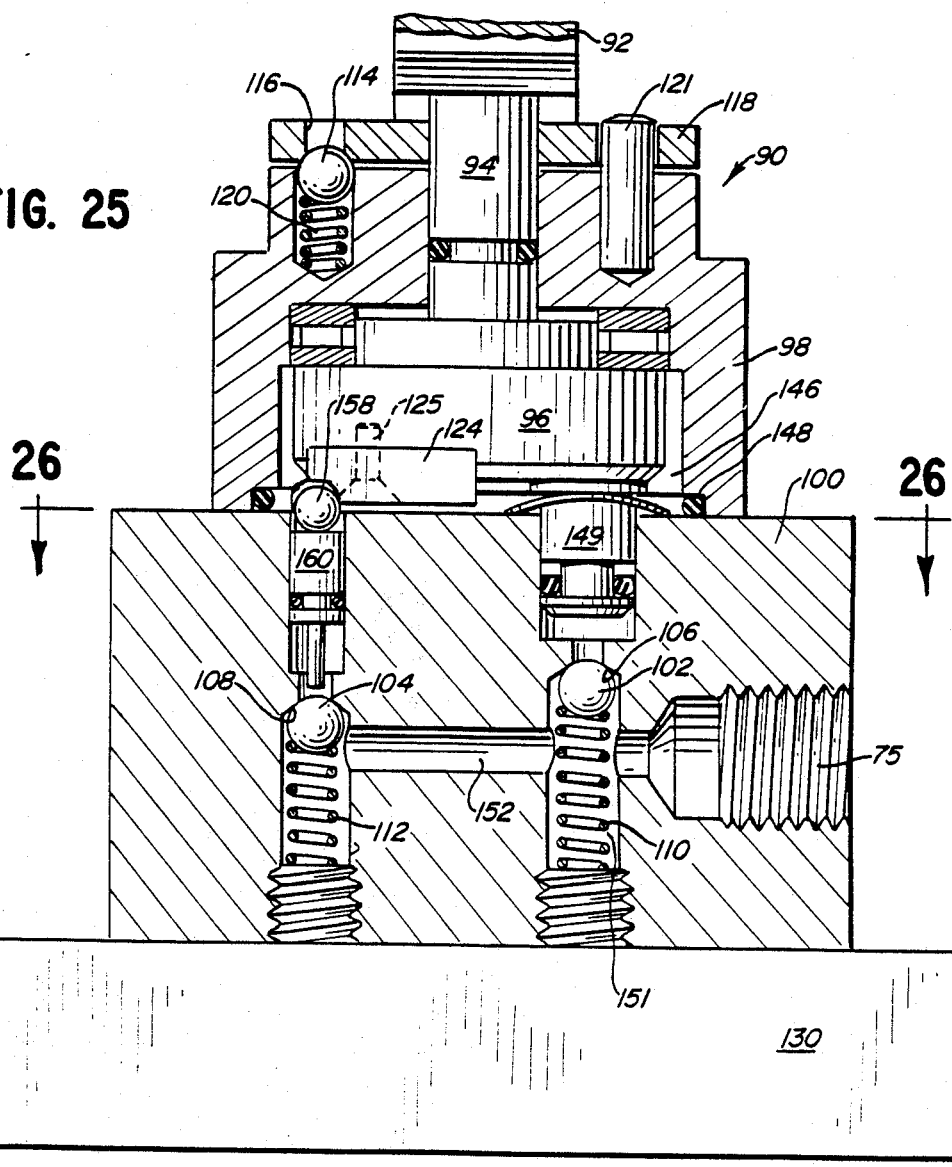
FIG. 25 is a sectional view taken on line 25—25 of FIG. 24.

FIGS. 21 through 27 are directed to a second embodiment of a flow control valve made in accordance with the teachings of this invention. Such valve 90 is seen in FIG. 25 and includes an upper handle 92, a valve rotor 96 rotatably mounted in a valve housing 98 overlying a valve body 100. The latter valve body has two spring-loaded check valves 102, 104 urged against seats 106 and 108 respectively by springs 110 and 112 respectively. Rotor 96 is located in the three positions of "neutral", "advance" and "retract" by means of the spring-loaded detent ball 114 urged into spaced recesses 116 of rotatable valve cap 118, see FIGS. 24 and 25. Spring 120 illustrated in FIG. 25 urges the ball 114 into its spaced position-defining recesses 116.

As will be noted in FIG. 24, the rotational movement of the rotor 96 in the housing 98 is guided by means of guide pin 121 which is mounted in housing 98. Pin 121 interfits with arcuate slot 122 which rotates with the rotor 96, as handle 92 is manually actuated. Handle 92 is connected to valve rotor 96 by stem 94.

It will also be noted from FIG. 25 that cam plate 124 is secured to the bottom of rotor 96 by means of a screw 125 or the like. The assembly of the rotor 96, housing 98 and valve body 100 may be secured to an underlying base 130 as by means of screws 127, illustrated in FIG. 24, which traverse aligned apertures of the housing 98 and valve body 100 prior to being anchored in the base 130.

The valve embodiment 90 of FIGS. 21 through 27 by virtue of the two check valves employed, eliminates the necessity of the plurality of fluid passageways of the valve embodiment 10. As noted from FIG. 21, when valve 90 is in the neutral position, pressurized flow from a pump traverses the base 130 prior to entering passageway 140 in valve body 100. The passageway 140 terminates at its upper end in illustrated valve seat 142 which is spring biased against the undersurface of rotor 96 in the manner illustrated in FIG. 25 by spring 60. The fluid passes through the passageway 140 and seat 142 into right-angle passageway 144 disposed in rotor 96 for discharge at the periphery of the rotor into underlying annular chamber 146, more clearly seen in FIG. 25. Chamber 146 is surrounded by an O-ring 148. The liquid passing into annular chamber 146 enters the top of jet pump 150, illustrated in FIG. 21, passing through the valve body 100 and base 130 to tank.

When the rotor 196 is indexed to an "advance" position, illustrated in the exploded view of FIG. 22, the liquid flow again passes from the pump through base plate 130 through passageway 140 and valve body 100 to surface seat 142, and then through unidirectional passageway 143 disposed in the valve rotor 96. Passageway 143 has a ball and pin disposed within the interior thereof whereby flow may only take place from passageway entry 143E to the passageway terminus 143T.

If flow were attempted from 143T to 143E in the reverse direction, ball valve 147 disposed in passage 143 would seat at the left passageway end, preventing fluid flow out of 143E.

Liquid flow exits the rotor 96 at 143T into underlying seat 149 which is concentric with the passageway end 143T. Seat 149 is disposed at the upper terminus of a fluid passageway 151 disposed in valve body 100. Passageway 151 is intersected by passageway 152 (FIG. 25) which is in communication with a site of hydraulic liquid use, such as a lifting jack hydraulic cylinder.

It will be more clearly seen from FIG. 25 of the drawing, that when valve 90 is in a non-advance position, the ball valve 102 is seated in seat 106 of the passageway 151. However, upon pressurized fluid flow entering seat 149 and passageway 151, ball 102 is removed from its seat 106 in the manner illustrated in FIG. 22 against the action of spring 110, allowing fluid flow to a cylinder or other site of use in the manner illustrated in FIG. 22.

FIG. 23 illustrates the valve 90 in a retract position in which rotor 96 has been indexed to a new position in which the incoming fluid flow passing through seat 142 passes through right angle passageway 154 disposed in the rotor 96, and the fluid discharging at the periphery of the rotor body accumulates in the annular chamber 146 illustrated in FIG. 25 for passage through underlying jet pump 150. With the rotor in the position of FIG. 23, cam plate 126 has been moved into a position to depress ball 158 which is normally disposed in a position located above the surface of valve body 100, as illustrated in FIG. 25. It will be further noted from the latter figure that ball 158 rests atop a plunger pin 160 which in the lowered or depressed position unseats check valve ball 104 from its seat 108 against the action of spring 112, allowing fluid passage from the cylinder through passageways 75, 152 with the ball 104 in its unseated position. Fluid flow passes from the cylinder through passageway 152 through passageway 154, see FIGS. 23 and 26, allowing the fluid in the line 154 from the cylinder to be aspirated into the jet pump 150 as a result of the main flow passage of the hydraulic fluid under pressure from the pump in the manner illustrated in FIG. 23. Thus, fluid, such as hydraulic liquid from a cylinder or the like, will be readily exhausted from the cylinder and aspirated to tank, together with hydraulic liquid being cycled from the pump.

Figure 27:
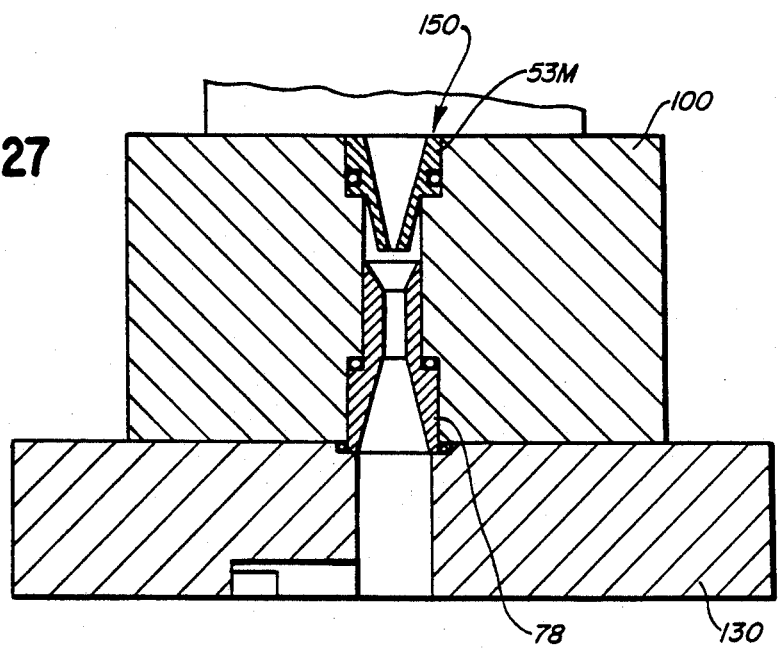
FIG. 27 is a fragmentary sectional view illustrated on an enlarged scale of a jet pump which may be employed in the valve construction of FIGS. 21 through 26.

FIG. 27 is an enlarged sectional view illustrating the two discrete pieces which nozzle 53M and diffuser 78M of the jet pump 150 may assume rather than the construction illustrated in FIG. 23.

Figure 26:
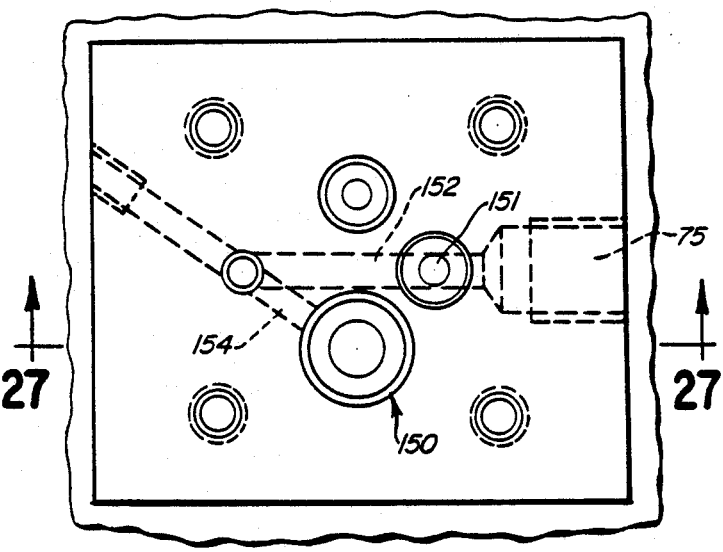
FIG. 26 is an elevational view taken along line 26—26 of FIG. 25 and illustrating internal passages in phantom line.

FIG. 26 illustrates in greater detail the flow path of the hydraulic liquid in valve body 100 from a cylinder or work site to the area above depressed check valve 102, and into the passageway 154, comprising an intake branch of the jet pump 150.

FIGS. 28 through 32 are directed to a second modified control valve construction 170 in which the valve rotor 18 is of precisely the same construction as valve rotor 18 of the first-discussed valve embodiment 10. Also, the intermediate valve body 14 is of precisely the same construction as body 14 of valve 10 with respect to the valve seats and flow passageways therethrough. As is most apparent from the sectional view of FIG. 31, valve construction 170 employs a pilot piston 172 for purposes of engaging and unseating a check valve ball 174 seated on seat 176 in passageway 75. The latter passageway communicates with a hydraulic cylinder or other site of hydraulic liquid or fluid use. Check valve 174 engages seat 176 and is urged into the seated position by means of spring 178. In the normal course of operation, and specifically in the course of cylinder retraction, pilot piston-operated valve 172 will be unseated in the manner hereinafter described in detail.

Figure 28:
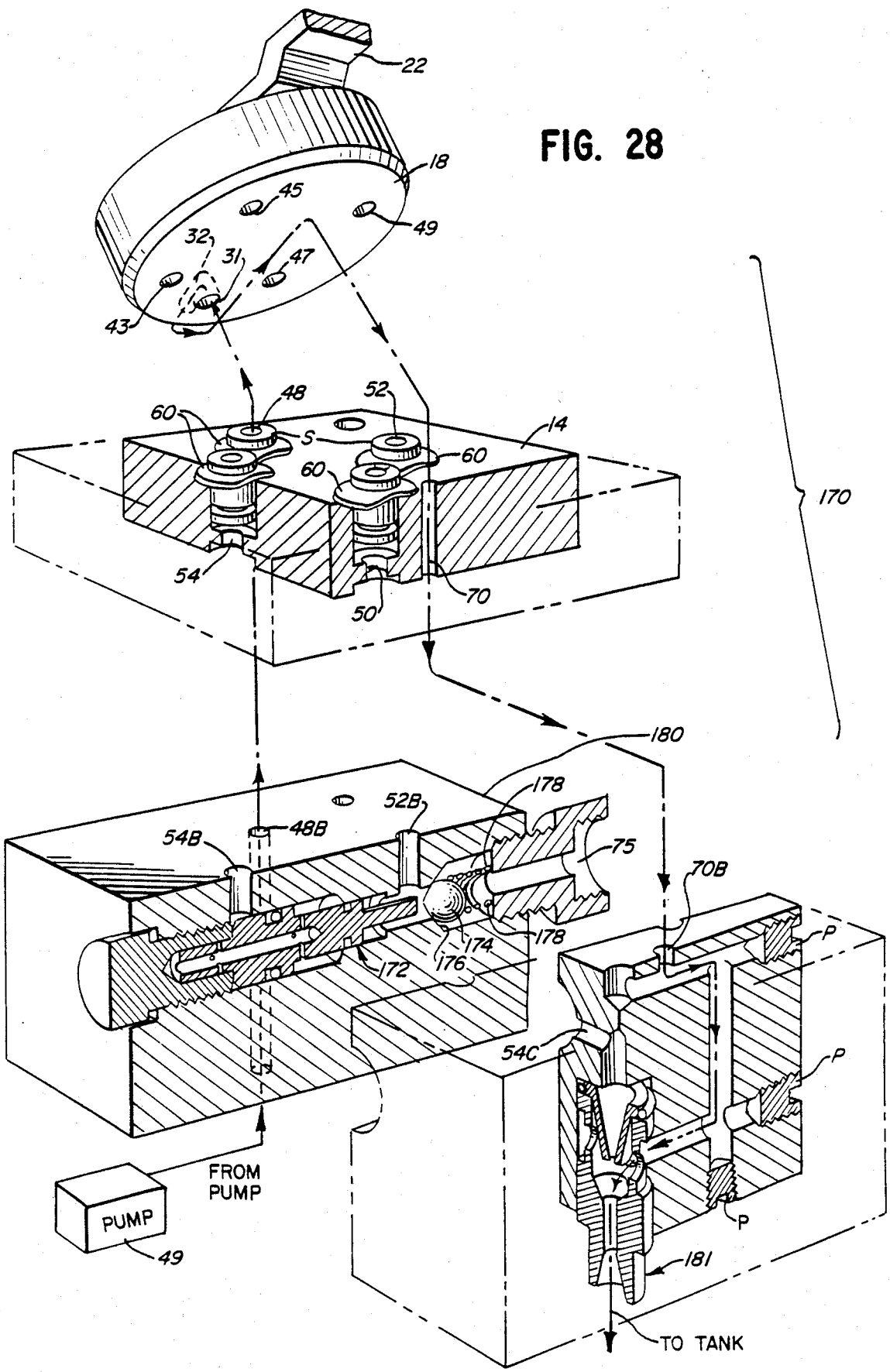
FIG. 28 is a fragmentary exploded view, partly in section, of components of a third embodiment of a control valve made in accordance with the teachings of this invention illustrating fluid flow therein when such valve is in a "neutral" position.

The normal "neutral", "advance" and "retract" functions of the valve 170 are as follows. Referring now more particularly to FIG. 28, the relationship between the valve rotor 18, intermediate valve body 14 and underlying valve block 180 is as follows. Actuating fluid such as hydraulic liquid passes from a hydraulic pump 49 through passageway 48B in lower valve block 180 into overlying and aligned passageway 48 in valve body 14 for entrance into entryway 31 of fluid passage 32 formed in the valve rotor 18. The liquid discharges from the rotor 18 into the annular fluid chamber 34, see FIG. 31, defined by the rotor 18, its surrounding housing 16 and the underlying valve body 14. The liquid in the chamber 34 then passes into the vent passageway 70 into underlying passageway 70B of the underlying block 180 and then into jet pump 181 mounted in the block 180 in the manner illustrated in FIG. 28. The cycling fluid will then pass to tank as indicated.

Figure 29:
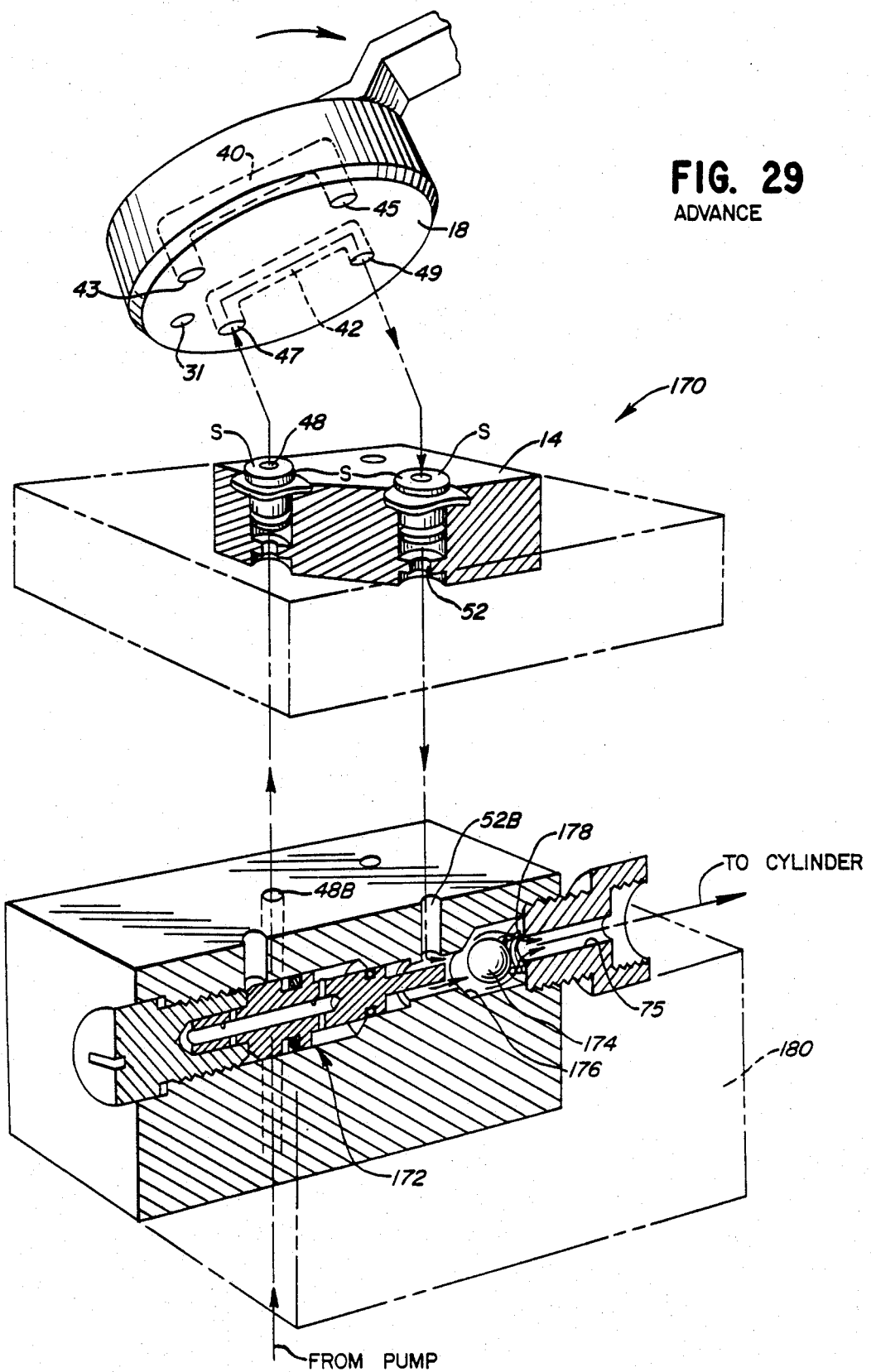
FIG. 29 is a view similar to FIG. 28 illustrating fluid flow in the valve components when such valve is in an "advance" position.

In the advance position for the rotary valve 170, illustrated in FIG. 29, the rotor 18 is positioned relative to the underlying valve body 14 and the fluid passageways disposed therein in such manner that the hydraulic liquid or other activating fluid passes from the pump through the passageway 48B in the lower block 180 through passageway 48 of overlying valve body 14 into end 47 of passageway 42 of rotor 18. The fluid exits passageway 42 through end 49 and enters the seat S disposed over passageway 52 of the block 14. The bottom end of passageway 52 is in fluid-sealing engagement with passageway 52B of the block 180 by means of O-ring 64 in the manner illustrated in FIG. 31. The hydraulic liquid or other fluid passing through passageway 52B unseats check ball 174 from seat 176 in passageway 175 as illustrated in FIG. 29. The unseated ball 174 enables the pumped liquid to proceed to the cylinder or other site of use whereat a work piston or ram is extended from a cylinder.

Figure 30:
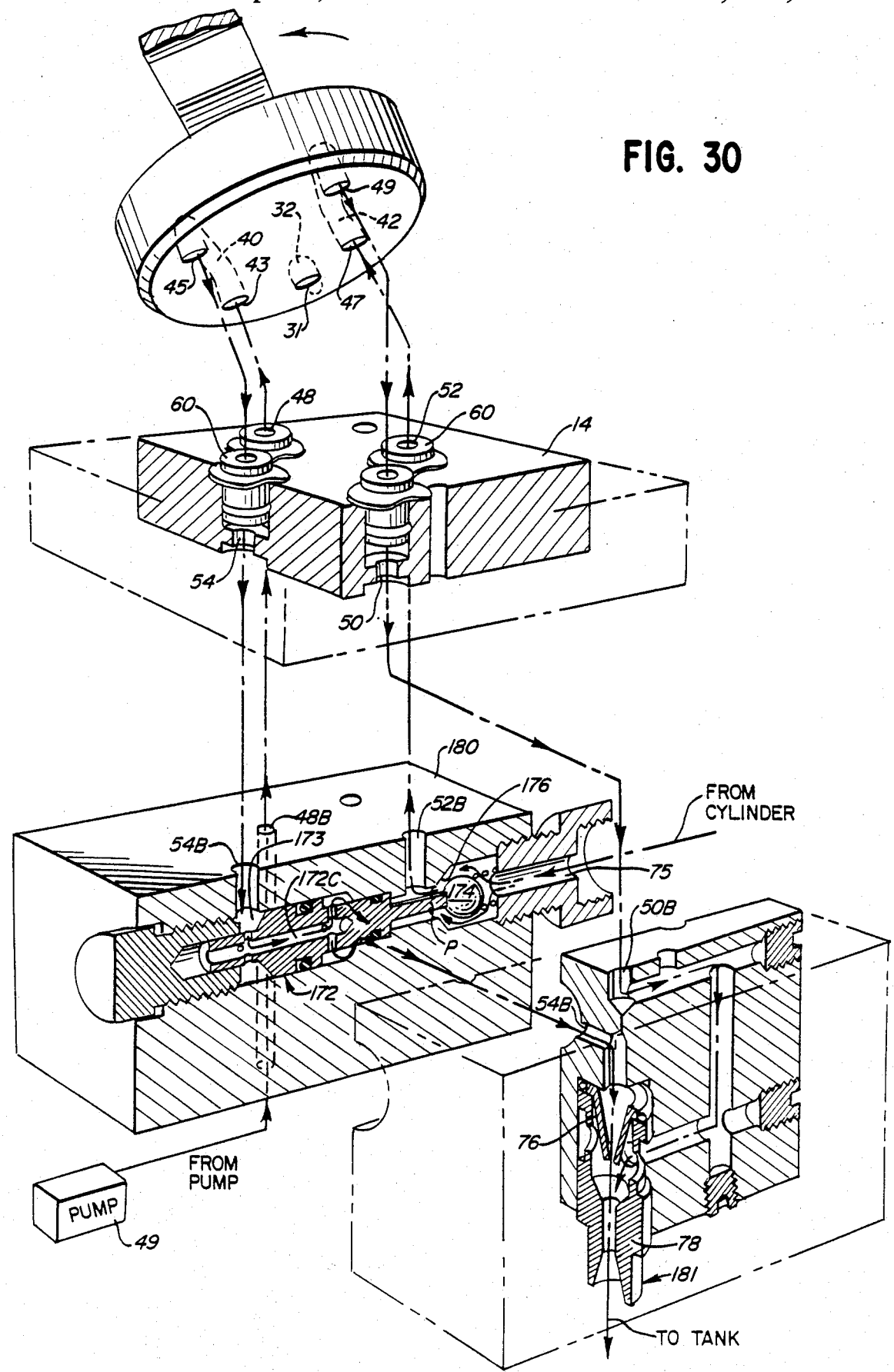

FIG. 30 illustrates the components of the valve embodiment 170 in a relationship assumed for purposes of retracting an extended piston in a hydraulic cylinder. In such position, activating fluid such as hydraulic liquid is pumped through passageway 48B of the lower block 180. The liquid passes into overlying and aligned passageway 48 of valve body 14, into end 43 of passageway 40 in rotor 18, and exits from such passageway at 45 and is returned into the valve body 14 through passageway 54. The liquid then strikes bevelled surface 173 of piston 172 urging the piston and its terminal pin P axially to the right unseating ball 174 from its seat 176 as illustrated in FIG. 30. The liquid then enters into the hollow center 172C of pilot piston 172 mounted in block 180 and is discharged through radial openings 183. (See FIG. 32) After unseating of the ball in opposition to spring 178 fluid flow passing from piston 172 proceeds through passageway 54E in block 180 into the upper conical portion of jet pump 181 whereafter the liquid passes from the pump to tank.

In the course of such pumped liquid passing through the diffuser portion of the jet pump 150 a partial vacuum is created. Such partial vacuum will enable the liquid in a cylinder passing through passageway 75, which is now open because of the unseating of ball valve 174, to pass through passageway 52B in block 180. The liquid from the cylinder then passes through overlying passageway 52 of valve body 14 into overlying and aligned opening 47 of rotor passageway 42, from end 49 of passageway 42 into passageway 50 of valve body 14, and down into underlying aligned passageway 50B of the block 180. It will be clearly seen from FIG. 30 that passageway 50B enters into the side of the jet pump 181, whereby the liquid in passageway 50B is aspirated into the jet pump 181 for discharge to tank along with the main recycled hydraulic liquid stream.

It is believed evident from the above descriptions of the various forms of the rotary valves 10, 90 and 170 that a variety of valve structures may incorporate the inventive features of the provided invention for purposes of positively aspirating or drawing hydraulic liquid or other fluids from a site of use. As is apparent from the embodiment 10 above described, it is not necessary to employ a check valve in conjunction with the fluid passages and jet pump employed for creating an area of low pressure within the valve body. It is also believed apparent from the valve embodiments 90 and 170 that various check valve arrangements and pilot pistons may be employed for controlling the various flows while aspirating liquid from a hydraulic cylinder as the main source of activating liquid is cycled to tank or reservoir. As previously noted, the valves incorporating the jet pumps need not be rotary. Slide valves, poppet valves etc. will work to equal advantage.

Although in the valve embodiments illustrated and described, a valve rotor is adjustable relative to the remaining valve elements; obviously any valve element containing plural passageways may be adjustable relative to the other to form desired passageway combinations. The various combinations may provide varying fluid paths relative to the jet pump, hydraulic cylinders, etc.

In view of the foregoing, it is believed apparent that a number of modifications of the inventive embodiments disclosed may be readily effected by those skilled in the art. Accordingly, this invention is to be limited only by the scope of the appended claims.

What is claimed is:

1. In a liquid flow system having a plurality of connecting passageways, the Combination comprising first means for pumping a main liquid stream along a path and effecting movement of a liquid-actuated member into a desired work position from an initial position; means confining a portion of said main liquid stream which maintains such liquid-actuated member in desired work position; second means for pumping the confined portion of said main liquid stream and effecting movement of such liquid-actuated member into said initial position, and adjustable valve means movable into a plurality of positions of adjustment and having a plurality of liquid passageways for controlling the passage of liquid pumped by the first and second pumping means relative to said liquid actuated member; said second pumping means comprising a jet set pump disposed in said valve means through which the main liquid stream passes for creating a partial vacuum in said jet pump; said partial vacuums being in communication with the confined portion of said main liquid stream when said valve means is in a first position of adjustment; said first pumping means cycling the main liquid stream to tank and the confined liquid being confined within the confining means when said valve means is in a second position of adjustment; said first pumping means cycling the main liquid stream to tank and the confined liquid being confined within the confining means when said valve means is in a second position of adjustment; said first pumping means cycling the main liquid stream to the confining means when said valve means is in a third position of adjustment, and a check valve disposed in a liquid passageway of said valve means for preventing passage of the confined liquid from the confining means when said valve means is in said second position of adjustment.

2. The flow system of claim 1 in which the check valve is moved into a position allowing passage of the confined liquid to the jet pump when said valve means moves into said first position of adjustment.

3. The flow system of claim 2 in which the check valve is in combination with and moved by a pilot piston which is disposed in the path of the main liquid stream and is thereby moved against the check valve when said valve means moves into the first position of adjustment.

4. The flow system of claim 1 or 3, in which a hydraulic piston and cylinder unit is in combination therewith comprising said fluid actuated member and confining means, and said liquid comprises hydraulic liquid.

5. The flow system of claim 1 or 3 in which said valve means is manually controlled.

6. The flow system of claim 1 or 3 in which said valve means is automatically controlled.

7. In a flow control valve construction having a plurality of communicating fluid passageways, a jet pump connected to at least two of said passageways in such manner that fluid flow from at least one of said passageways through said jet pump creates a low-pressure zone in said jet pump to which flow in another of said passageways in said valve construction is drawn; said valve construction comprising first and second valve members; said first valve member having a first plurality of fluid passageways therein; at least one of said valve members being adjustable relative to the other valve member; said second valve member having a second plurality of fluid passageways disposed therein whereby fluid flow between the fluid passageways of said first and said second valve members may be adjusted by adjusting one of said valve members relative to the other; a main fluid pump for pumping a main fluid stream, in fluid flow communication with said jet pump when said first valve member is in a first position of adjustment relative to said second valve member; a hydraulic piston and cylinder unit containing hydraulic liquid in fluid communication with said jet pumps by means including fluid passageways which connect the hydraulic liquid of said cylinder with said jet pump whereby the hydraulic liquid is drawn to the low pressure zone of said jet pump when said first valve member is in said first position of adjustment relative to said second valve member, and a resiliently biased check valve disposed in a fluid passageway connecting said cylinder and said jet pump; said resiliently biased check valve being moved into the open position by said first valve member when said first valve member assumes said first position of adjustment relative to said second valve member.

8. The control valve construction of claim 7 in which said fluid stream of said main fluid pump is connected to the cylinder of said piston and cylinder unit by valve fluid passageways when said first valve member is in a second position of adjustment relative to said second valve member, whereby hydraulic liquid pumped by said main pump extends the piston of said piston and cylinder unit.

9. The control valve construction of claim 7 in which said main pump cycles hydraulic liquid to tank, and the hydraulic liquid within said hydraulic cylinder is confined therein when said first valve member is in a third position of adjustment relative to said second valve member.

10. The control valve construction of claim 9 in which the hydraulic liquid cycled to tank passes through said jet pump, and a resiliently biased check valve disposed in a fluid passageway connecting the hydraulic liquid of said cylinder with said jet pump confines the hydraulic liquid within the hydraulic cylinder when said first valve member is in said third position of adjustment relative to said second valve member.

11. The control valve construction of claim 10 in which said resiliently biased check valve is disposed on a fluid sealing seat in said fluid passageway connecting the hydraulic liquid of said cylinder with said jet pump, and means for removing said valve from its sealing seat are disposed in the path of the main fluid flow to said jet pump and actuated by the main fluid flow to said jet pump to remove said check valve from its sealing seat when said one valve member is in said first position relative to said second valve member.

12. The control valve construction of claim 11 in which the valve removing means comprises a spring-loaded piston having a hollow fluid passageway terminating in radial fluid outlets for conducting a fluid stream between said main pump and said jet pump; said valve having a bevelled annular peripheral portion whereby hydraulic liquid striking the same moves said piston in the direction of said check valve which comprises a ball.

13. A directional flow control valve for controlling the flow of liquid to a hydraulic cylinder or the like comprising a valve body and a valve rotor having a plurality of liquid passageways disposed therein; said valve rotor being adjustably positionable relative to said valve body whereby different liquid passageways are formed between said valve body and rotor when said rotor is disposed in different positions of adjustment relative to said valve body; means for effecting fluid-tight connections between the passageways of said valve body and said valve rotor in said different positions of adjustment; aspirator means in said valve communicating with at least two of said fluid passageways in one position of rotor adjustment whereby liquid flow through one of said passageways into said aspirator means generates a partial vacuum adequate to induce flow of liquid into said aspirator means from a second of said fluid passageways communicating with said aspirator means.

14. The directional flow control valve of claim 13 in which a liquid passageway formed by both the valve rotor and valve body terminates in a work port for connection to a hydraulic cylinder or the like in one position of rotor adjustment relative to the valve body, whereby hydraulic liquid pumped through said latter passageway enters said hydraulic cylinder.

15. The directional flow control valve of claim 14 in which one end portion of said latter passageway terminates at a stop surface of said valve rotor when said control valve is in a neutral position with said valve rotor in a second position of adjustment relative to said valve body, whereby the hydraulic liquid within said hydraulic cylinder is confined therein.

16. The directional flow control valve of claim 13 in which a valve fluid passageway disposed in said valve body interconnects the aspirator means with a work port in said valve body for connecting said valve body to a hydraulic cylinder or the like.

* * * * *